United States Patent
Aguirre Andonegui (10) Patent No.: US 11,235,410 B2
(45) Date of Patent: Feb. 1, 2022

(54) MACHINE FOR THE DEPOSITION OF MATERIAL FOR THE PRODUCTION OF PIECES

(71) Applicant: GORATU MAQUINAS HERRAMIENTA, S.A., Elgoibar (ES)

(72) Inventor: Aitor Aguirre Andonegui, Elgoibar (ES)

(73) Assignee: ADDILAN FABRICACION ADITIVA S.L., Bizkaia (ES)

( * ) Notice: Subject to any disclaimer, the term of this patent is extended or adjusted under 35 U.S.C. 154(b) by 883 days.

(21) Appl. No.: 15/769,559

(22) PCT Filed: Sep. 1, 2016

(86) PCT No.: PCT/ES2016/070617
§ 371 (c)(1),
(2) Date: Apr. 19, 2018

(87) PCT Pub. No.: WO2017/068212
PCT Pub. Date: Apr. 27, 2017

(65) Prior Publication Data
US 2018/0281095 A1 Oct. 4, 2018

(30) Foreign Application Priority Data
Oct. 19, 2015 (ES) .................. 201531501

(51) Int. Cl.
*B23K 9/04* (2006.01)
*B33Y 30/00* (2015.01)
*B23K 9/173* (2006.01)

(52) U.S. Cl.
CPC .............. *B23K 9/044* (2013.01); *B23K 9/173* (2013.01); *B33Y 30/00* (2014.12)

(58) Field of Classification Search
CPC ................................ B23K 9/044; B23K 9/173
(Continued)

(56) References Cited

U.S. PATENT DOCUMENTS

| 2002/0090313 A1 | 7/2002 | Wang et al. |
| 2014/0363532 A1* | 12/2014 | Wolfgram ............. B29C 64/106 425/113 |

(Continued)

FOREIGN PATENT DOCUMENTS

| DE | 10342882 A1 | 5/2005 |
| EP | 2386404 A1 | 11/2011 |
| WO | 2011019287 A2 | 2/2011 |

OTHER PUBLICATIONS

International Search Report dated Nov. 17, 2016 for PCT/ES2016/070617 and English translation.

*Primary Examiner* — Tu B Hoang
*Assistant Examiner* — Alba T Rosario-Aponte
(74) *Attorney, Agent, or Firm* — Lucas & Mercanti, LLP (57) ABSTRACT

A machine for the deposition of material for the production of pieces, with a structural housing including an inner chamber in which an arc torch operates in order to melt a strand of material with which pieces are formed on a supporting table; the arc torch is mounted on a frame positioned horizontally in the upper part of the chamber, on which the arc torch is mounted with a movement system driven by several actuation devices located on the outside of the structural housing. The supporting table is positioned below the frame in an assembly that can move towards or away from the frame, with a side sub-chamber located facing the supporting table and equipped with a cover that opens outwards, and towards which the supporting table can pivot for the removal of the pieces.

5 Claims, 6 Drawing Sheets

(58) Field of Classification Search
USPC .................................. 219/76.1, 76.12, 76.14
See application file for complete search history.

(56) References Cited

U.S. PATENT DOCUMENTS

| | | | |
|---|---|---|---|
| 2015/0108095 A1* | 4/2015 | Kruer ..................... | B23K 9/167 |
| | | | 219/74 |
| 2015/0321418 A1* | 11/2015 | Sterman ................ | B29C 64/118 |
| | | | 264/40.7 |
| 2016/0167309 A1* | 6/2016 | Liu ....................... | B29C 64/106 |
| | | | 264/40.1 |
| 2016/0263827 A1* | 9/2016 | Fripp ..................... | B29C 64/124 |
| 2016/0303801 A1* | 10/2016 | Chang ................... | B29C 64/118 |
| 2016/0339634 A1* | 11/2016 | Fuller ................... | B29C 64/118 |
| 2017/0106594 A1* | 4/2017 | Gardiner ............... | B29C 64/118 |

* cited by examiner

MACHINE FOR THE DEPOSITION OF MATERIAL FOR THE PRODUCTION OF PIECES

CROSS REFERENCE TO RELATED APPLICATION

This Application is a 371 of PCT/ES2016/070617 filed on Sep. 1, 2016, which, in turn, claimed the priority of Spanish Patent Application No. P 201531501 filed on Oct. 19, 2015, both applications are incorporated herein by reference.

TECHNICAL SECTOR

The present invention is related to the production of pieces by layer-by-layer deposition of molten material until the volume of the piece being produced is created, proposing for this purpose a machine for the deposition of material developed with a series of construction and functional characteristics that make it well suited to perform this function.

STATE OF THE ART

The production of pieces with complicated shapes using expensive materials such as titanium, inconel, etc. by means of deposition of the formation material, using techniques such as arc welding, to apply the molten material in the corresponding zone, thus directly creating the volume of the piece being produced with optimum use of the material, is known.

A torch is used to melt the material to be deposited, which is fed by means of a strand that is supplied continuously to the fusion torch, which must be moved over the work zones to progressively form the volume of the piece to be produced by means of deposited layers of the formation material.

This technique, on one hand, poses the problem of the execution of the necessary movements of the fusion torch and/or the piece that is being formed, to achieve the desired shapes, because precise movements are required and with a total field of movement, making it inadvisable for the actuating means (such as motors, etc.) to be close to the point where the formation material of the pieces is melted, given that the high temperatures required to melt the formation material are very detrimental to said actuating means of the movements.

In addition, due to the fact that some of the formation materials, such as titanium, tend to oxidize quickly when they come into contact with the atmosphere, in the space where the material is melted to form the pieces being produced, an artificial atmosphere must be created with inert gases (such as argon or helium), which requires an environment for those gases that is complex to create and maintain, and which results in significant wasted time, in addition to the high cost if the inert gas is lost every time a finished piece is removed and must be replaced for the production of another piece.

OBJECT OF THE INVENTION

According to the invention, a machine is proposed for the melting and deposition of material for the production of pieces, which has been developed with a series of characteristics that efficiently and practically solve the movements required to carry out the deposition of material in the necessary deposition zones in the pieces to be produced, as well as the establishment of an artificial atmosphere by means of inert gases, with minimal wasted time and low consumption of the inert gases in the formation of said artificial atmosphere to produce successive pieces.

This machine that is the object of the invention comprises a structural housing that forms an inner chamber, at the top of which is a horizontal rack in which a torch based on arc technology is incorporated, which is fed by a strand of material to be melted, with said torch mounted on a movement system that allows it to be moved to any point of the internal surface area of the rack, with a supporting table for the pieces to be produced positioned below, which is capable of moving towards and away from the upper rack, with a sub-chamber equipped with a moveable cover that opens to the outside located on one side of said interior chamber of the structural housing, with the supporting table of the pieces to be produced able to pivot towards said sub-chamber, thus facilitating the loading and removal of the piece to be produced.

According to one embodiment, the movement system of the arc torch is formed by two perpendicular cross-pieces that are arranged in a movement assembly in both orthogonal directions by means of several linear actuators that are driven by corresponding actuation means that are installed outside the structural housing of the machine; with the arc torch in turn connected to the cross-pieces by means of a rotating actuator system that allows the orientation of the arc torch.

This results in a machine in which the mounting of the arc torch allows it to be positioned precisely at any point for the deposition of the formation material of the pieces to be produced, the volume of which can be formed by superimposing layers of materials that can be made thanks to the relative movement between the supporting table of the pieces and the rack that carries the arc torch for the melting of the metal; all of this with the actuation means of the movements located outside the chamber in which the pieces are formed, so that the high melting temperatures of the formation material of the pieces do not affect said movement actuation means, which prevents deterioration, making the machine last longer in good condition for the practical function of its application.

On the other hand, the pivoting of the supporting table of the pieces that are produced towards the side sub-chamber, allows the produced pieces to be removed, through said sub-chamber, because in this operation, the supporting table of the pieces itself creates a closure of the sub-chamber on the interior, such that the inert gas contained in the chamber for the formation of the pieces to prevent the oxidation of the material, is retained inside the chamber and is not lost, which avoids the economic cost of the lost gas, as well as the time required to restore said gas in successive operations for the formation of other pieces.

For all of these reasons, the disclosed machine has several characteristics that are highly advantageous for the practical function of the formation of pieces by deposition of material for which it is designed, taking on a life of its own and making it preferable to the conventional machines for the same application.

DETAILED DESCRIPTION OF THE INVENTION

The object of the invention refers to a machine to form pieces by means of direct deposition of a molten material, making it possible to produce complex pieces effectively and with precision, in several advantageous conditions.

The machine disclosed comprises a structural housing (1), which forms an inner chamber (2) in which an arc torch (3) operates, into which a strand (4) of material to be melted is fed to form pieces (5) on a supporting table (6) by means of the accumulation of molten material in superimposed layers.

The arc torch (3) is incorporated into a frame (7) positioned horizontally in the top part of the chamber (2), with said arc torch (3) positioned in the frame (7) by means of a movement system (26) that allows it to be positioned at any point in the interior space of the aforementioned frame (7).

Figure 6:
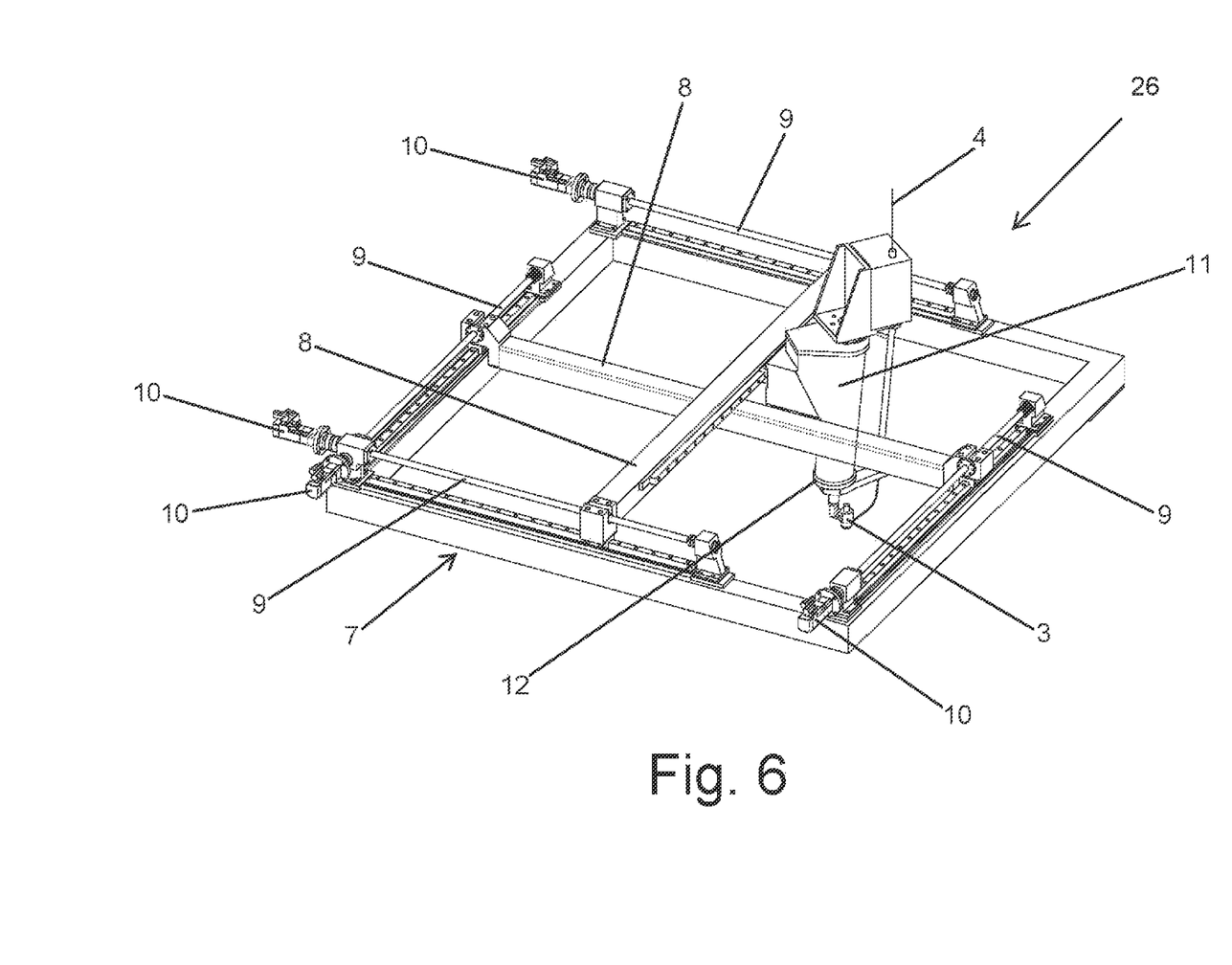
FIG. 6 shows a perspective view of an exemplary embodiment of the frame that carries the torch for melting the material for the formation of the pieces in the machine that is the object of the invention.

According to a practical embodiment, the movement system (26) of the arc torch (3) comprises two perpendicular cross-pieces (8), which can move in the two orthogonal directions, with each one mounted on two opposing crossbars of the frame (7). The two cross-pieces (8) can move on the crossbars by means of several linear actuators (9) that are driven by the corresponding actuation means (10), which may be motors of any type; with the linear actuators (9) extending to the outside of the structural housing (1), which is where the actuation means (10) are located, which are therefore outside of the influence of the high temperatures produced in the chamber (2) by the melting of the material used to form the pieces (5) to be produced.

The arc torch (3) is connected to the cross-pieces (8) by means of a sliding coupling over each one of them, such that by means of a combined movement of said cross-pieces (8), the assembly acts as a pantograph, allowing the arc torch (3) to be positioned at any point in the space inside the frame (7) to form different parts of the pieces (5) to be produced.

In this arrangement, the arc torch (3) is also incorporated on a support (11), which is what is connected to the cross-pieces (8), on which said arc torch (3) is installed on a rotating mount, such that by means of a corresponding actuator (12), it can be oriented to deposit the molten material adequately to configure the different pieces (5) to be produced.

Figure 3:
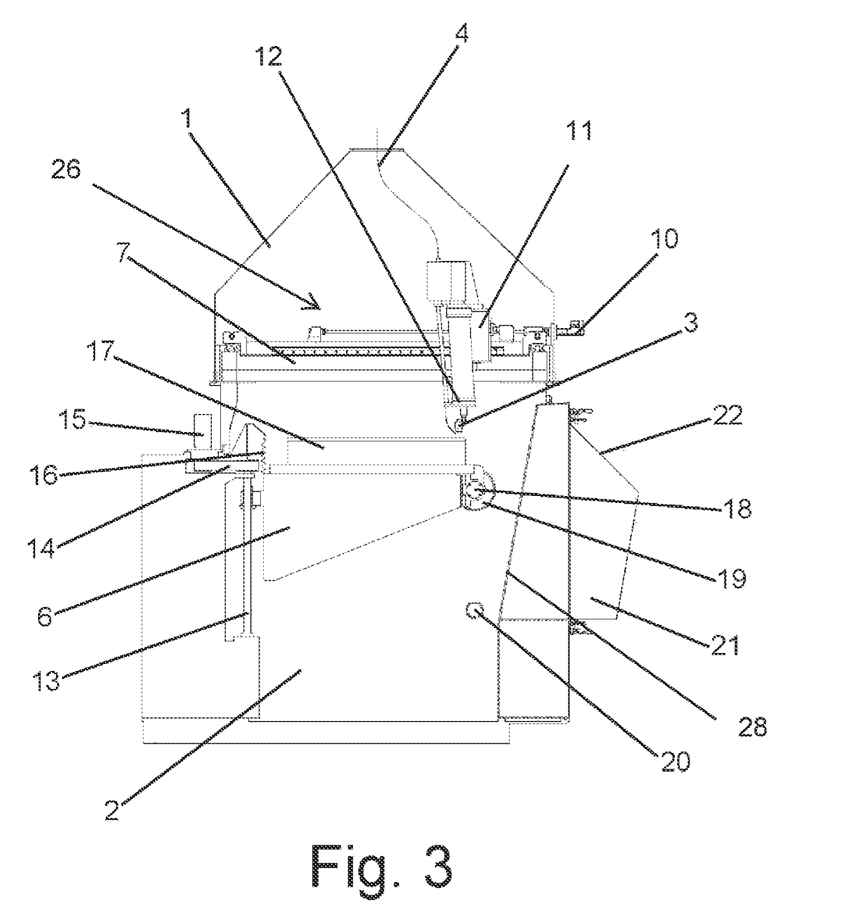
FIG. 3 is a cross-section side view of the machine in a starting position for the production of a piece.
Figure 4:
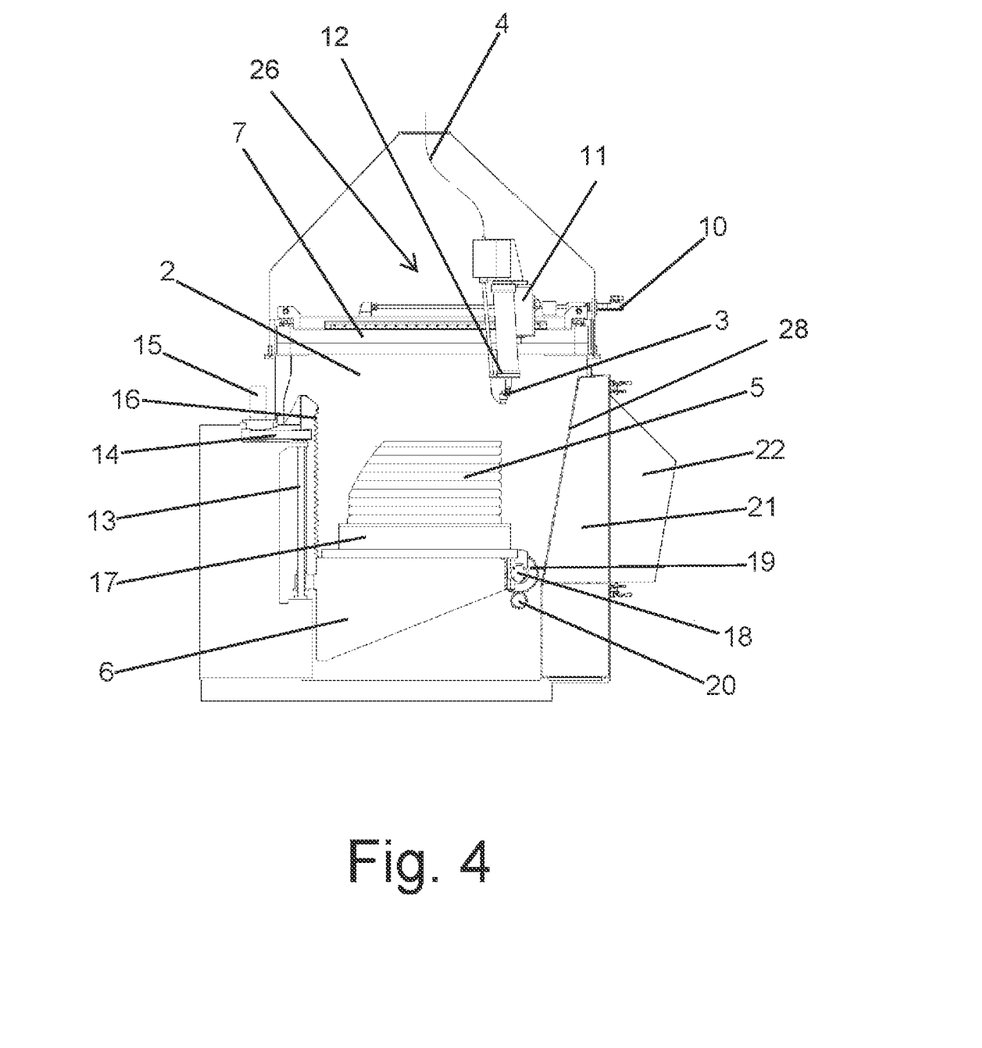
FIG. 4 is a cross-section side view of the machine in a finishing position for the production of a piece.

The supporting table (6) on which the pieces (5) to be produced are formed, is incorporated into an assembly that can move towards or away from the frame (7), such that, starting from a starting position for the formation of a pieces (5), with the supporting table (6) positioned near the arc torch (3), by means of successive movements by the supporting table (6) away from the arc torch (3), successive layers of the molten material can be deposited to form the corresponding part of the piece (5) to be produced.

To do this, the supporting table (6) may be moveable with respect to the frame (7), which remains fixed, or vice-versa, or both the supporting table (6) and frame (7) may be moveable, moving towards and away from each other, but due to the simplicity of the installation, the supporting table (6) is planned to be moveable and the frame (7) fixed, with the supporting table (6) installed on a spindle (13) for this reason, coupled by means of a transmission (14) to an actuator motor (15) that is in turn outside of the structural housing (1), and is therefore not affected by the high temperatures that are produced in the chamber (2). In regard to the supporting table (6), a protection spring (16) that can extend and retract depending on the upward and downward moments of the supporting table (6) is installed, such that the protection spring (16) protects the spindle (13) from the material to be melted with which the pieces (5) are formed.

Figure 5:
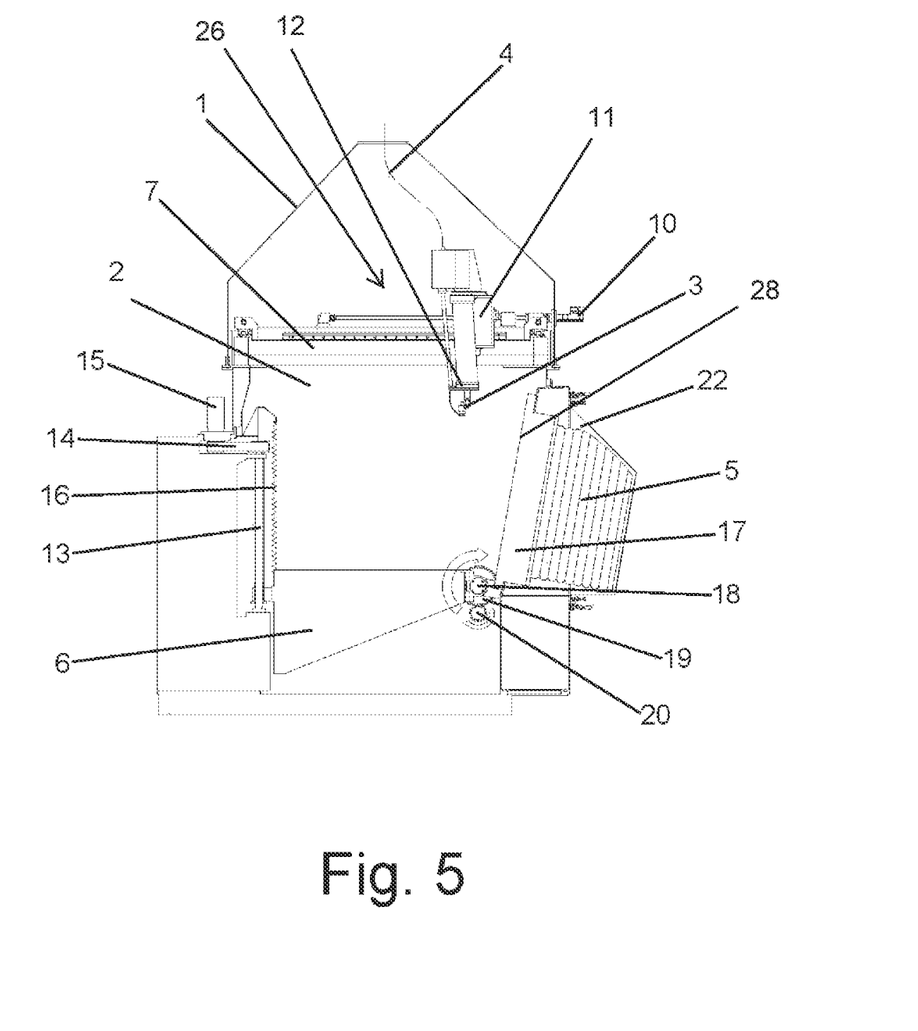
FIG. 5 is a cross-section side view of the machine in a position for removing a produced piece.

The top of the supporting table (6) is equipped with a platform (17), which is connected to the end of said supporting table (6) by means of a joint (18) on which a gear (19) is installed, with an actuator gear (20) in an interlocking position with said gear (19) when the supporting table (6) is in the lower position of its movement associated with a means of rotating actuation (not shown), such that by means of said actuator gear (20), actuation can be applied that allows the platform (17) to pivot between a position lowered on the supporting table (6) and a position in which it is pivoted forward. Also, according to the design, the rotation actuation means of said actuator gear (20) are installed on the outside of the structural housing (1).

Also, facing the position of the supporting table (6), a side sub-chamber (21) is defined, open on the interior part towards the chamber (2) and closed on the exterior part with a moveable cover (22).

Figure 1:
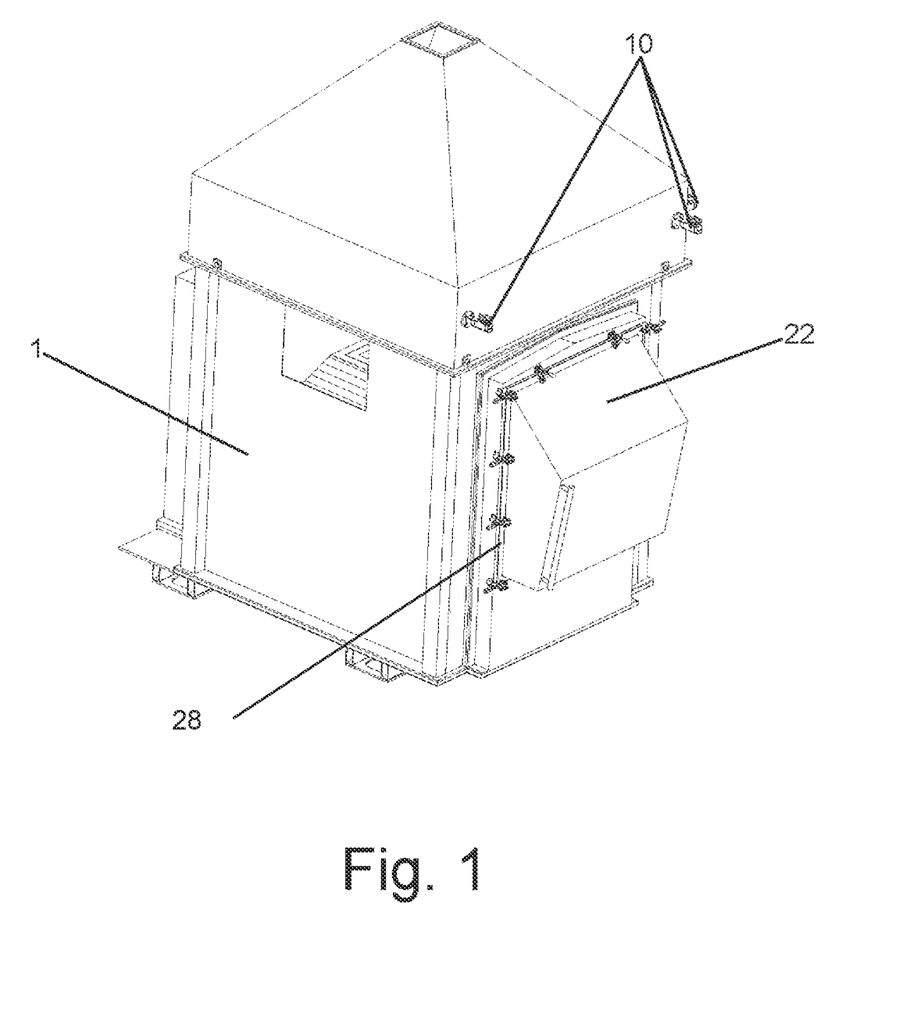
FIG. 1 shows a perspective view of the exterior of an exemplary embodiment of the machine that is the object of the invention.
Figure 2:
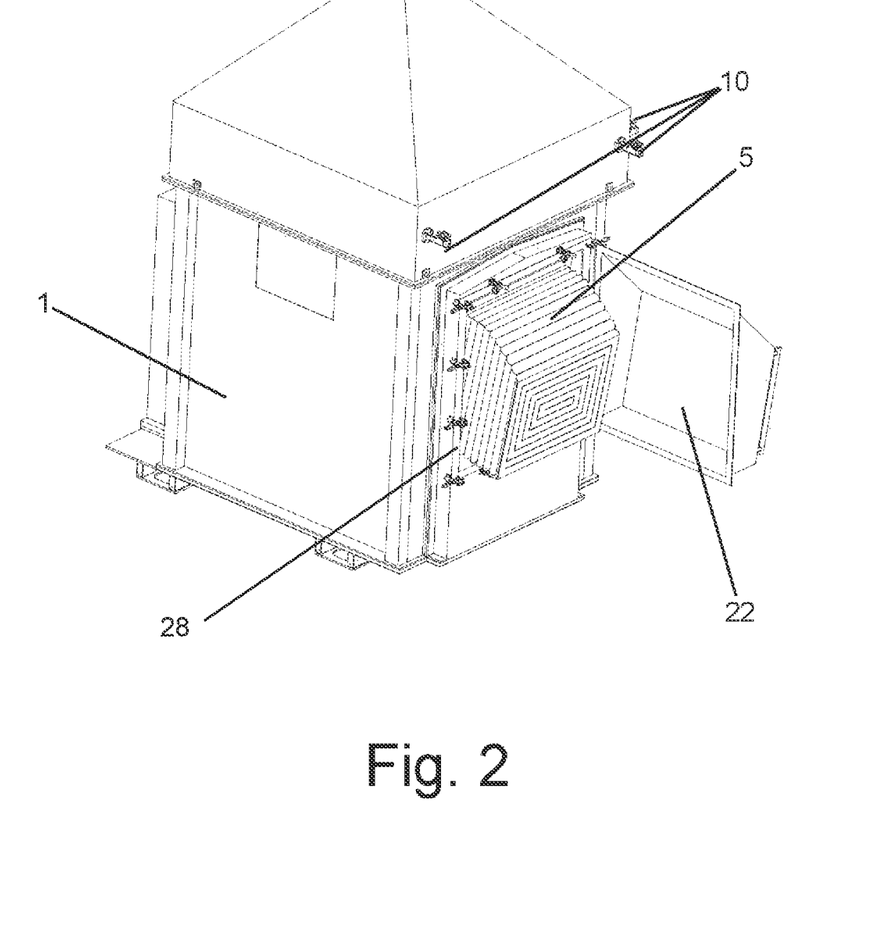
FIG. 2 is a perspective view like the one in the previous figure, with the side sub-chamber of the machine open in the arrangement for removing a produced piece.

Thus, when the formation of a piece (5) has been completed on the supporting table (6), with the supporting table (6) positioned in the lower position, where the gear (19) meshes with the actuator gear (20), by means of the actuation of said actuator gear (20), the pivoting of the platform (17) towards the side sub-chamber (21) can be triggered, such that the piece (5) is introduced into said side sub-chamber (21), with the platform (17) connected on the interior opening of said side sub-chamber (21), as shown in FIG. 5, such that by opening the cover (22), the piece (5) can be removed, as shown in FIG. 2.

Said arrangement allows the chamber (2) to be filled with an inert gas, such as argon or helium, to prevent the oxidation of the material that is melted to form the pieces (5) to be produced, allowing the produced pieces (5) to be removed from the side sub-chamber (21), without allowing the gas contained in the chamber (2) to escape and be lost, because the connection of the platform (17) to the interior opening of the side sub-chamber (21) in the unloading operation creates an hermetic seal that allows said side sub-chamber (21) to be opened to remove the piece (5), without the gas exiting from the chamber (2).

This results in a machine that is functionally advantageous for the formation of pieces (5) by means of direct deposition of molten material on the zones to be configured, with a machine architecture that is optimized in terms of its dimensions, such that, for example, with machine dimensions of 2850 millimeters high and 2126 millimeters wide and long, it is possible to produce pieces that are 500 millimeters high by 1000 millimeters wide and long, in optimum conditions for use of space.

The invention claimed is:

1. A machine for a deposition of material for production of pieces, comprising a structural housing having an inner chamber and a side sub-chamber, the inner chamber comprising
a frame positioned horizontally in an upper part of the inner chamber;

a supporting table, positioned below the frame, that moves towards or away from the frame;

an arc torch for melting a strand of material with which the pieces are produced on the supporting table, wherein the arc torch is mounted on the frame positioned horizontally in the upper part of the chamber;

a movement system comprising linear actuators driven by corresponding linear actuation means, the linear actuation means located on an outside of the structural housing, the side sub-chamber located facing the supporting table and equipped with a moveable cover that opens outwards, and towards which the supporting table can pivot for removal of the pieces produced, wherein the supporting table has a platform on top, connected to the supporting table by means of a joint on which a gear is mounted that meshes with an actuator gear when the supporting table is in a lowering position of its movement away from the upper part of the inner chamber of the frame, to pivot the platform towards the side sub-chamber.

2. The machine for the deposition of material for the production of pieces, according to claim 1, wherein the movement system further comprises two perpendicular cross-pieces, each of which is mounted on the frame and movable in two orthogonal directions.

3. The machine for the deposition of material for the production of pieces, according to claim 1, wherein the arc torch is coupled to each one of the cross-pieces through a support, wherein said arc torch is rotatably installed to the support by means of an actuator.

4. The machine for the deposition of material for the production of pieces, according to claim 1, wherein the supporting table is installed on a spindle that is driven by an actuator motor located on the outside of the structural housing.

5. The machine for the deposition of material for the production of pieces, according to claim 1, wherein in the pivoting towards the side sub-chamber, the platform of the supporting table forms a hermetic seal on an interior opening of said side sub-chamber.

* * * * *